United States Patent
Jiang et al.

(10) Patent No.: US 12,450,361 B2
(45) Date of Patent: Oct. 21, 2025

(54) ANALYZING QR CODE RISK

(71) Applicant: INTERNATIONAL BUSINESS MACHINES CORPORATION, Armonk, NY (US)

(72) Inventors: Peng Hui Jiang, Beijing (CN); Zhi Li Guan, HaiDian District (CN); Sheng Yan Sun, Beijing (CN); Jun Su, Beijing (CN); Kun Yang, Beijing (CN); Yi Wen Huang, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 201 days.

(21) Appl. No.: 18/177,812

(22) Filed: Mar. 3, 2023

(65) Prior Publication Data
US 2024/0296232 A1    Sep. 5, 2024

(51) Int. Cl.
G06F 21/57    (2013.01)
G06F 21/53    (2013.01)

(52) U.S. Cl.
CPC ............ *G06F 21/577* (2013.01); *G06F 21/53* (2013.01); *G06F 2221/033* (2013.01)

(58) Field of Classification Search
CPC ... G06F 21/577; G06F 21/53; G06F 2221/033
See application file for complete search history.

(56) References Cited

U.S. PATENT DOCUMENTS

| | | | |
|---|---|---|---|
| 8,381,276 B2 | 2/2013 | Costinsky | |
| 8,464,960 B2* | 6/2013 | Ibrahimbegovic | G06K 19/06037 380/243 |
| 8,869,271 B2* | 10/2014 | Jayaraman | H04L 63/1416 726/25 |
| 9,058,490 B1 | 6/2015 | Barker | |
| 9,396,376 B1 | 7/2016 | Narayanaswami | |
| 9,635,042 B2* | 4/2017 | Brown | H04L 63/1433 |
| 10,725,803 B1* | 7/2020 | Zhu | G06F 21/64 |
| 11,769,577 B1* | 9/2023 | Dods | G16H 20/10 705/50 |
| 2020/0177633 A1* | 6/2020 | Shivamoggi | G06F 18/23213 |
| 2023/0385815 A1* | 11/2023 | Jakobsson | G06Q 20/36 |
| 2024/0338955 A1* | 10/2024 | Choi | G06T 7/0012 |
| 2024/0364733 A1* | 10/2024 | Burns | H04L 63/1425 |
| 2024/0372842 A1* | 11/2024 | Sprague | H04L 63/0861 |

OTHER PUBLICATIONS

Al-Zahrani, et al., "Secure Real-Time Artificial Intelligence System against Malicious QR Code Links", Wiley, Hindawi, Security and Communication Networks, vol. 2021, Article ID 5540670, Dec. 8, 2021, pp. 1-11, https://www.hindawi.com/journals/scn/2021/5540670/.

(Continued)

*Primary Examiner* — Linglan Edwards
*Assistant Examiner* — Jacob Benedict Knackstedt
(74) *Attorney, Agent, or Firm* — Elliot J. Shine

(57) ABSTRACT

A method, computer system, and a computer program product for risk analysis is provided. The present invention may include receiving an access request. The present invention may include analyzing a matrix barcode associated with the access request. The present invention may include validating the matrix barcode. The present invention may include providing a validation status to a user.

15 Claims, 3 Drawing Sheets

(56) References Cited

OTHER PUBLICATIONS

Disclosed Anonymously, "Method of Detecting and Ranking Risk of Short URL", IP.com, IPCOM000270626D, Jul. 23, 2022, pp. 1-6, https://priorart.ip.com/IPCOM/000270626.
Disclosed Anonymously, "Method to avoid QR Code phishing based on context verification", IP.com, PCOM000224987D, Jan. 18, 2013, pp. 1-6, https://priorart.ip.com/IPCOM/000224987.
Krombholz, et al., "QR Code Security: A Survey of Attacks and Challenges for Usable Security", Springer International Publishing, Switzerland, 2014, pp. 79-90, https://link.springer.com/chapter/10.1007/978-3-319-07620-1_8.
No Author, "6Connex", https://web.archive.org/web/20220518000319/https://www.6connex.com/retired-event/, May 18, 2022, 4 pages.
No Author, "Bitforex.com", https://web.archive.org/web/20080605130907/https://www.bitforex.com/, Jul. 23, 2022, 3 pages.
No Author, "Super Survey", https://web.archive.org/web/20220518232158/https://www.supersurvey.com/Not- Found, May 18, 2022, 1 page.

* cited by examiner

ANALYZING QR CODE RISK

BACKGROUND

The present invention relates generally to the field of computing, and more particularly to risk analysis.

A QR code (Quick Response Code) may be a type of matrix (two dimensional) barcode. A barcode may be a machine-readable optical label that may contain information generally and/or about an item to which the QR code is attached. Unlike one-dimensional bar codes, a QR code design may allow characters to be stored in a format where the data may not be identified by a single set of vertical black strips, but rather, black dots may be arranged on a square grid against a white background. QR codes often store various kinds of information, such as, but not limited to, data for a locator, identifier, or tracker that points to a website URL, applications, PDF files, landing pages, questionnaires, airline boarding passes, digital coupons, product details, videos, or audio, amongst other information. The QR codes may be read by smartphone camera applications and/or standalone QR code readers which may read the QR code and direct the smartphone or QR code reader to perform a certain action.

However, due to the properties of QR codes, their adoption may increase a user's vulnerability to phishing attacks and/or security breaches, such as, no required manually entering of URLs and inability of smartphones and/or QR code readers to display an entire URL associated with the QR code. Accordingly, a validation process of QR codes prior to exposing a user to phishing attacks and/or other security breaches is required.

SUMMARY

Embodiments of the present invention disclose a method, computer system, and a computer program product for risk analysis. The present invention may include receiving an access request. The present invention may include analyzing a matrix barcode associated with the access request. The present invention may include validating the matrix barcode. The present invention may include providing a validation status to a user.

In another embodiment, the method may include extracting one or more characteristics from the matrix barcode.

In a further embodiment, the method may include performing a characteristic connection between the one or more characteristics from the matrix barcode and a plurality of characteristics from previously identified malicious matrix barcodes stored in a risk knowledge base.

In yet another embodiment, the method may include identifying one or more similar characteristics between the matrix barcode and at least one of the malicious matrix barcodes using k-means clustering.

In addition to a method, additional embodiments are directed to a computer system and a computer program product for dynamically evaluating the risk profile of a matrix barcode on the server side prior to providing user access.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
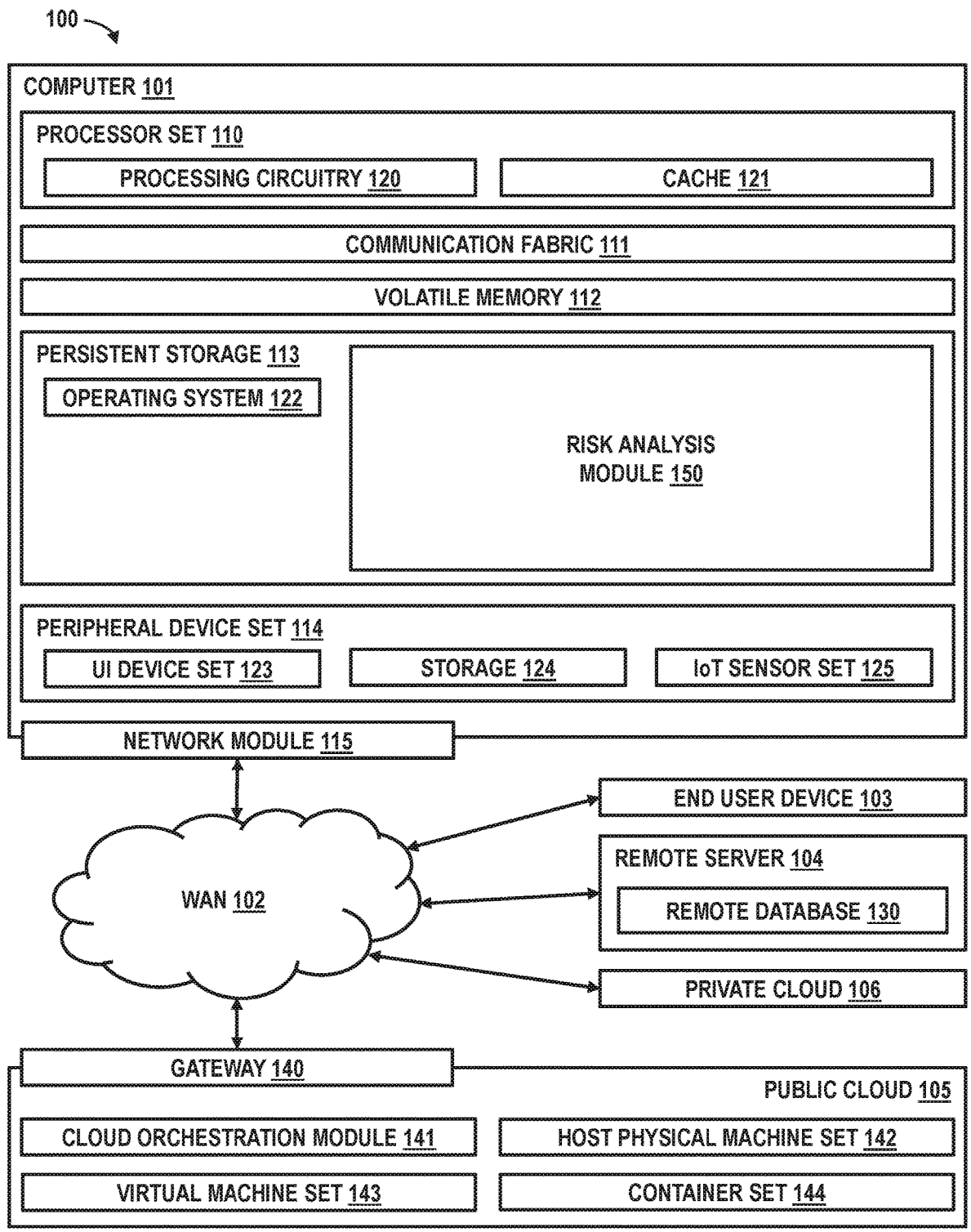
FIG. 1 depicts a block diagram of an exemplary computing environment according to at least one embodiment.

The following described exemplary embodiments provide a system, method and program product for risk analysis. As such, the present embodiment has the capacity to improve the technical field of risk analysis by dynamically evaluating the risk profile of a matrix barcode on the server side prior to providing user access. More specifically, the present invention may include receiving an access request. The present invention may include analyzing a matrix barcode associated with the access request. The present invention may include validating the matrix barcode. The present invention may include providing a validation status to a user.

As described previously, a QR code (Quick Response Code) may be a type of matrix (two dimensional) barcode. A barcode may be a machine-readable optical label that may contain information generally and/or about an item to which the QR code is attached. Unlike one-dimensional bar codes, a QR code design may allow characters to be stored in a format where the data may not be identified by a single set of vertical black strips, but rather, black dots may be arranged on a square grid against a white background. QR codes often store various kinds of information, such as, but not limited to, data for a locator, identifier, or tracker that points to a website URL, applications, PDF files, landing pages, questionnaires, airline boarding passes, digital coupons, product details, videos, or audio, amongst other information. The QR codes may be read by smartphone camera applications and/or standalone QR code readers which may read the QR code and direct the smartphone or QR code reader to perform a certain action.

However, due to the properties of QR codes, their adoption may increase a user's vulnerability to phishing attacks and/or security breaches, such as, no required manually entering of URLs and inability of smartphones and/or QR code readers to display an entire URL associated with the QR code. Accordingly, a validation process of QR codes prior to exposing a user to phishing attacks and/or other security breaches is required.

Therefore, it may be advantageous to, among other things, receive an access request, analyze a matrix barcode associated with the access request, validate the matrix barcode, and provide a validation status to a user.

According to at least one embodiment, the present invention may improve the evaluation of a matrix barcode while limiting the vulnerability and/or risk on the client side by validating the matrix barcode in a matrix barcode secure sandbox on the server side using one or more web vulnerability scanning tools.

According to at least one embodiment, the present invention improves dynamic evaluation of a short URL in an organization by evaluating the short URL dynamically and periodically to reflect an up to date status of the short URL. This evaluation being performed on the server side instead of the client side to avoid misuse of the short URL, additionally, relieving the need of an intermediate web page because all information can be rendered around the short URL.

According to at least one embodiment, the present invention may improve the assessment of matrix barcodes by extracting one or more characteristics from the matrix barcode and performing a characteristic connection between the one or more characteristics from the matrix barcode and a plurality of characteristics from previously identified malicious matrix barcodes stored in a risk knowledge base. Furthermore, the invention may identify one or more similar characteristics between the matrix barcode and at least one of the malicious matrix barcodes using k-means clustering.

According to at least one embodiment, the present invention may improve QR code and/or other matrix barcode validation by rendering content in a matrix barcode secure sandbox to access the risk of the QR code and/or other matrix barcodes. While the prior art focuses on stagnant information retrieved from a database the present inventions dynamic validation is conducted in real time navigating available buttons within the URL destination. Accordingly, in the present invention the validation of the QR code is dynamic and not fixed during a creation phase.

According to at least one embodiment, the present invention may improve cyber security threat assessments by assessing the risks according to different user groups and enabling malware and/or threat information to be shared amongst a plurality of users using a risk knowledge base shared amongst users.

According to at least one embodiment, the present invention may improve user understanding with respect to cyber threats presented by matrix barcodes and allow users to further access risk prior to visiting target URLs by using a matrix barcode decorator to provide a validation status, evaluation, and description of a URL associated with an access request. The validation status may be a warning, prohibition, or approval associated with visiting the target URL. The evaluation may be the threat posed by the target URL and the description may provide a definition and/or examples of the threat posed. The present invention enabling a user to evaluate the validation status, evaluation, and description prior to being exposed to user-side risk.

Referring to FIG. 1, Computing environment 100 contains an example of an environment for the execution of at least some of the computer code involved in performing the inventive methods, such as dynamically evaluating the risk profile of a matrix barcode on the server side prior to providing user access using the risk analysis module 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IOT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor Set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

Communication fabric 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent Storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

According to the present embodiment, the computer environment 100 may use the risk analysis module 150 to dynamically evaluating the risk profile of a matrix barcode on the server side prior to providing user access. The risk analysis method is explained in more detail below with respect to FIG. 2.

Figure 2:
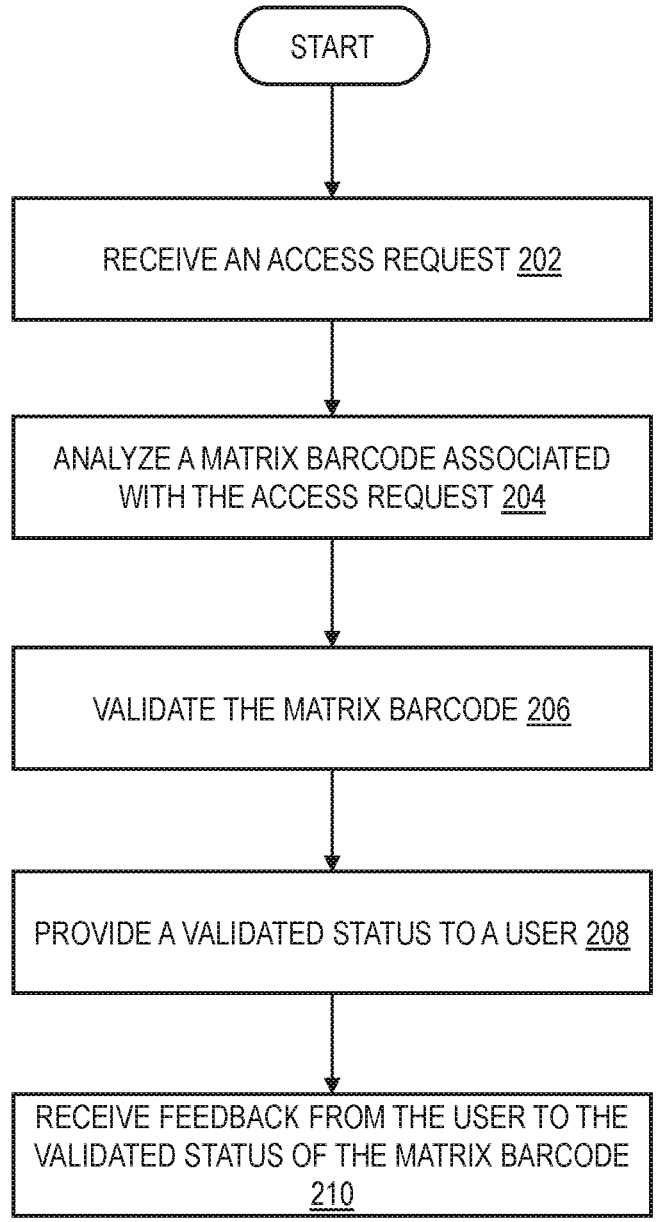
FIG. 2 is an operational flowchart illustrating a process for risk analysis according to at least one embodiment.

Referring now to FIG. 2, an operational flowchart illustrating the exemplary risk analysis process 200 used by the risk analysis module 150 according to at least one embodiment is depicted.

At 202, the risk analysis module 150 receives an access request. The access request may be received from a user for a machine-readable code, such as, but not limited to, a QR code, RFID (radio frequency identification) codes, a barcode, data matrix codes, matrix barcodes, amongst other existing and/or later-developed machine-readable optical labels utilized for conveying large amounts of data in a small format. The risk analysis module 150 may receive the access request from an IoT (Internet of Things) device associated with the user, such as, but not limited to, a smart phone, smart glasses, an EUD 103, UI device set 123 of the peripheral device set 114, and/or another device associated with the user.

At 204, the risk analysis module 150 analyzes the matrix barcode associated with the access request. The risk analysis module 150 may analyze the matrix barcode associated with the access request using a risk knowledge base (e.g., database 130). As will be explained in more detail below, the risk analysis module 150 may build the risk knowledge base (e.g., database 130) using at least pattern recognition, characteristic connection, k-means clustering, and/or one or more publicly available resources.

The risk analysis module 150 may extract one or more characteristics from the matrix barcode associated with the access request, such as, but not limited to, one or more URLs (Uniform Resource Locators), web pages, user profiles, and/or ISPs (Internet Service Providers), amongst other characteristics which may be associated with the matrix barcode. The one or more URLs extracted from the matrix barcode may be compared to a plurality of URLs stored in the risk knowledge base (e.g., database 130). The plurality of URLs stored in the risk knowledge base (e.g., database 130) may include a plurality of URLs collected from domain feeds provided from one or more publicly available URL blacklists and/or one or more malicious URLs previously identified by the risk analysis module 150 based on one or more previous access requests.

The risk analysis module 150 may utilize the characteristics extracted from the matrix barcode associated with the access request, such as, but not limited to, URL characteristics, webpage characteristics, user profile characteristics, ISP characteristics, amongst other characteristics, in at least building connections between the characteristics extracted from the matrix barcode associated with the access request and the characteristics of the plurality of matrix barcodes stored in the risk knowledge base (e.g., database 130). As will be explained in more detail below, the risk analysis module may utilize the characteristics to construct k-means clustering for malicious matrix barcodes.

In an embodiment, the risk analysis module 150 may utilize the one or more characteristics from the matrix barcode in performing a characteristic connection between the one or more characteristics of previously identified malicious matrix barcodes from the risk knowledge base (e.g., database 130) utilizing the following equation:

$$\mathrm{argmin}\, s \sum_{i=1}^{k} \sum_{x \in S_i} \|x - \mu_i\|^2 = \mathrm{argmin}\, s \sum_{i=1}^{k} |S_i| \mathrm{Var}\, S_i$$

given set of observations ($x_1, x_2, \ldots, x_n$), wherein each observation may be a d-dimensional real vector, k-means clustering may aim to partition the n observations into k ($\leq n$) sets S={$S_1, S_2, \ldots, S_k$} which may minimize the within-cluster sum of squares (WCSS) (i.e., variance).

For example, in the above equation the given set of observations ($x_1, x_2, \ldots, x_n$) may include the URL characteristics $x_1$, the web page charactertics $x_2$, the user profile characteristic $X_3$, and the ISP characteristics $x_4$. The above equation may be utilized by the risk analysis module 150 in comparing the characteristics of the matrix barcode associated with the access request and the plurality of matrix barcodes stored in the risk knowledge base (e.g., database 130). The risk analysis module 150 may utilize a similarity threshold in comparing the characteristics, such as 0.01 or 0.1, the similarity threshold may depend based on at least one or more of, the k-means clustering dimension, device associated with the user, ownership of the device, user preferences, Wi-Fi network security protocols, user characteristics, organizational protocols, amongst other factors. As will be explained in more detail below, the similarity threshold, factors utilized in setting the similarity threshold, user preferences, and/or additional rules with respect to accessing target URLs may be stored in a rules database, the rules database may be a separate database within database 130, which may enable rules and/or preferences to easily be managed, and/or part of the risk knowledge base. For example, the similarity threshold for each characteristic may be higher for a personal device when compared to a device issued by an employer and/or the similarity threshold for web page characteristics may be higher than URL characteristics.

For each access request received the risk analysis module 150 may perform the analysis described in detail above in determining whether the matrix barcode associated with the access request is similar to one or more of the plurality of entries stored within the risk knowledge base (e.g., database 130). In determining whether the matrix barcode associated with the access request is similar to known malicious activities stored in the risk knowledge base (e.g., database 130) such as, but not limited to, phishing attacks, malware, viruses, amongst other malicious activities, the risk analysis module 150 may utilize one or more HTTP response status codes in redirecting a user and/or providing a risk level to the user. For example, the risk analysis module 150 may utilize a 301 redirect and/or a 302 redirect in redirecting the user from the webpage associated with the matrix barcode for which the user requested access at step 202. If the risk analysis module 150 fails to identify any URLs and/or webpages stored in the risk knowledge base (e.g., database 130) the risk analysis module 150 may proceed by redirecting the characteristics associated with the matrix barcode to be validated in a matrix barcode secure sandbox.

Accordingly, the risk analysis module 150 may maintain a characteristic mapping between the matrix barcode of the access request and the target URL. The risk analysis module 150 may maintain the characteristic mapping in the risk knowledge base (e.g., database 130) and/or in a separate characteristic mapping database as described below with respect to FIG. 3. Additionally, the risk analysis module 150 may maintain a risk profile in addition to the characteristic mapping for the target URL which may be updated as malicious activities stored in the risk knowledge base (e.g., database 130). This may be updated as scheduled jobs to analyze the risk knowledge base (e.g., database 130) are performed.

At 206, the risky analysis module 150 validates the matrix barcode associated with the access request. The risk analysis module 150 may utilize a Matrix barcode Secure Sandbox in validating the matrix barcode associated with the access request. The risk analysis module 150 may utilize the Matrix barcode Secure Sandbox in validating the target URL using one or more web vulnerability scanning tools and/or the risk knowledge base (e.g., database 130).

As will be described in more detail with respect to at least FIG. 3 the Matrix barcode Secure Sandbox may be comprised of at least a Validator and a Sandbox Manager with the Sandbox Manager being further comprised of at least a Browser, Javascript® Engine (Javascript and all Javascript-based trademarks and logos are trademarks or registered trademarks of Oracle America, Inc. and/or its affiliates, in the United States and/or other countries), and/or a Web vulnerability scanning tool. The risk analysis module 150 may utilize the browser in rendering the target URL from the Sandbox Manager, the Javascript® Engine in providing a runtime for the one or more web vulnerability scanning tools, and the one or more web vulnerability scanning tools in running the scan of the target URL and generating a scanning result. As will be explained in more detail below, the validation status may be provided to the user by the matrix barcode decorator based on the scanning result generated by the one or more web vulnerability scanning tools.

Accordingly, the Sandbox Manager may generate a sandbox for rendering the content of the matrix barcode associated with the access request. The risk analysis module 150 may utilize a risk manager in evaluating the risk of the content rendered in the sandbox and/or a rule manager to evaluate the content based on rules stored in the rule base which may be specific to the user. As will be explained in more detail below with respect to step 208, the risk analysis module 150 may utilize the Validator in processing the output from the risk manager and/or rule manager and determining a validation status of the URL associated with the access request.

At 208, the risk analysis module 150 provides a validation status of the matrix barcode associated with the access request to the user. The risk analysis module 150 may display the validation status to the user on the smart phone, smart glasses, the EUD 103, UI device set 123 of the peripheral device set 114, and/or another device associated with the user utilized in sending the access request to the risk analysis module 150. The validation status may be displayed visibly within an internet browser along with the URL associated with the access request.

The validation status may include, but is not limited to including, a warning, prohibit, or an approval to visit the URL associated with the access request. The risk analysis module may utilize a matrix barcode decorator in providing the validation status, evaluation, and/or description within the UI display on the device associated with the user. The one or more validation statuses utilized by the risk analysis module 150 may be based on predefined settings, institutional settings, and/or user preferences stored in the rules base. The risk analysis module 150 may further utilize the matrix barcode decorator in providing colors, symbols, and/or additional visual indications within the internet browser corresponding to the validation status of the URL. The user may also be able to access additional information associated with the validation status such as an evaluation and/or a description provided by the matrix barcode decorator. The evaluation associated with a warning may be finger printers, social media trackers, cross-site tracking cookies, amongst other evaluations, which may be provided to the user using the matrix barcode decorator in addition to a warning validation status. Additionally, the risk analysis module 150 may provide a description corresponding to the evaluation associated with the warning using the matrix barcode decorator. For example, with respect to finger printers the risk analysis module 150 may provide the following description "Finger printers may collect settings from your browser and/or computer to create a profile of you. Using a digital fingerprint, these parties may be able to track you across different websites." Another example may be a validation status of prohibit. In this example, the evaluation associated with the prohibit validation status may be "malware" and the description displayed within the UI of the user device by the matrix barcode decorator may be a description of malware, such as, "Malware is software designed to infect your device without your knowledge. Malware is often used to steal personal information, send junk messages and/or mail, and/or spread additional malware."

As will be explained in more detail below, the user may evaluate the URL associated with the access request in determining whether to access the URL, this feedback may be utilized in either redirecting the user and/or directing the user to the URL.

At 210, the risk analysis module 150 receives feedback from the user to the validation status of the matrix barcode. The feedback from the user may be a request to visit the target URL based on the validation status and/or additional information provided by the matrix barcode decorator at step 208.

The risk analysis module 150 may redirect the user to the target URL extracted from the matrix barcode associated with the original access request received at step 202. The risk analysis module using a redirector may redirect the user to the target URL. The risk analysis module 150 may continuously monitor potential threats for at least the duration in which the user may actively be browsing the target URL using at least the one or more web vulnerability scanning tools describe at step 206. The risk analysis module 150 may utilize the data gathered during the user's active browsing of the target URL in at least updating data and/or risk profiles stored within the risk knowledge base (e.g., database 130).

Figure 3:
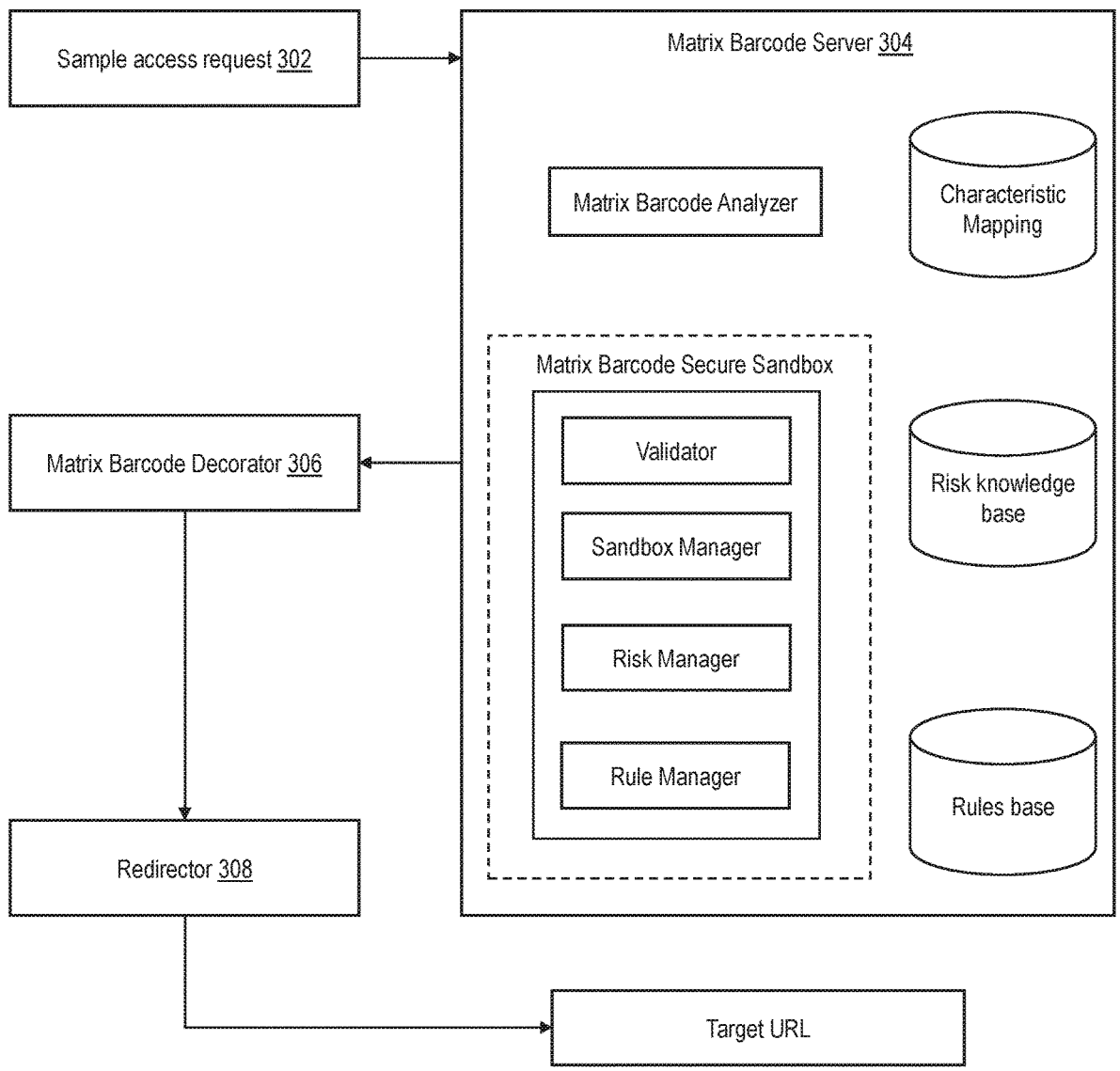
FIG. 3 depicts a block diagram illustrating the flow of an access request according to at least one embodiment.

FIG. 3 provides a block diagram illustrating the flow of an access request as processed within the matrix barcode server 304. The matrix barcode server 304 may be part of the remote server 104 of computing environment 100 and/or a separate server utilized by the risk analysis module 150.

As shown a sample access request 302 can first be received by the matrix barcode server 304 and analyzed by the matrix barcode analyzer 306. The matrix barcode of the sample access request 302 being analyzed by the matrix barcode analyzer utilizing the one or more characteristics extracted from the matrix barcode associated with the sample access request. The one or more characteristics being compared in a characteristic mapping to the plurality of matrix barcodes stored in the risk knowledge base. The characteristic mapping being described in more detail above with respect to at least step 204. If the characteristic mapping fails to identify any URLs and/or webpages stored in the risk knowledge base which may be sufficiently similar to the sample access request the process may proceed by validating the extracted characteristics in a matrix barcode secure sandbox.

As was discussed in detail with respect to at least steps 206 and 208 of FIG. 2, the matrix barcode may be validated using the matrix barcode secure sandbox and the validation status provided back to the user using the matrix barcode decorator 308. The Sandbox Manager may generate a sandbox for rendering the content of the matrix barcode associated with the access request. A risk manager may be utilized in evaluating the risk of the content rendered in the sandbox and/or a rule manager to evaluate the content based on rules stored in the rule base. The Validator may process the output from the risk manager and/or rule manager in determining a validation status of the URL associated with the access request.

The validation status provided to the user by the matrix barcode decorator 308 may include, but is not limited to including, a warning, prohibit, or an approval to visit the URL associated with the sample access request 302. Based on the information provided the user may provide feedback to the validation status such as a desire to visit the URL associated with the sample access request 302. In this scenario, the redirector 310 would direct the user to the target URL.

It may be appreciated that FIGS. 2 and 3 provide only an illustration of one embodiment and do not imply any limitations with regard to how different embodiments may be implemented. Many modifications to the depicted embodiment(s) may be made based on design and implementation requirements.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

The present disclosure shall not be construed as to violate or encourage the violation of any local, state, federal, or international law with respect to privacy protection.

What is claimed is:

1. A method for risk analysis, the method comprising:
receiving an access request from a device associated with a user, wherein the access request includes a matrix barcode;
analyzing a matrix barcode associated with the access request by extracting one or more characteristics from the matrix barcode;
performing a characteristic connection between the one or more characteristics from the matrix barcode and a plurality of characteristics from previously identified malicious matrix barcodes stored in a risk knowledge base;
validating the matrix barcode in a matrix barcode secure sandbox using one or more web vulnerability scanning tools, wherein the matrix barcode secure sandbox is comprised of at least a validator, a risk manager, a rule manager, and a sandbox manager, wherein the rule manager is utilized to evaluate the access request based on one or more rules specific to the user, and wherein the validator is configured to process output received from the risk manager and rule manager in determining a validation status of a Uniform Resource Locator (URL) associated with the access request; and
providing the validation status to the user.

2. The method of claim 1, further comprising:
identifying one or more similar characteristics between the matrix barcode and at least one of the malicious matrix barcodes using k-means clustering, wherein each of the one or more similar characteristics exceed a similarity threshold, wherein the similarity threshold is specific to the device associated with the user and includes at least a k-means clustering dimension threshold.

3. The method of claim 2, wherein at least one of the one or more similar characteristics is a similar visual characteristic identified based on applying the k-means clustering an image of the matrix barcode and images of the at least one malicious matrix barcode.

4. The method of claim 1, wherein the validation status provided to the user is displayed visibly within an internet browser on an end user device (EUD) of the user along with the URL associated with the access request, and wherein the validation status includes visual indicator corresponding to an evaluation and description corresponding to the evaluation, wherein the description corresponding to the evaluation is displayed to the user in response to user feedback received from the user to the validation status of the matrix barcode.

5. The method of claim 1, wherein the validating further comprises:
launching a matrix barcode server, wherein the matrix barcode server is an isolated computing environment;
executing the one or more web vulnerability scanning tools within the matrix barcode server to analyze the extracted characteristics of the matrix barcode for potential security threats; and
generating a validation result based on the analysis of the extracted characteristics, wherein the validation result is provided to the user as part of the validation status.

6. A computer system for risk analysis, comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
receiving an access request from a device associated with a user, wherein the access request includes a matrix barcode;
analyzing a matrix barcode associated with the access request by extracting one or more characteristics from the matrix barcode;
performing a characteristic connection between the one or more characteristics from the matrix barcode and a plurality of characteristics from previously identified malicious matrix barcodes stored in a risk knowledge base;
validating the matrix barcode in a matrix barcode secure sandbox using one or more web vulnerability scanning tools, wherein the matrix barcode secure sandbox is comprised of at least a validator, a risk manager, a rule manager, and a sandbox manager, wherein the rule manager is utilized to evaluate the access request based on one or more rules specific to the user, and wherein the validator is configured to process output received from the risk manager and rule manager in determining a validation status of a Uniform Resource Locator (URL) associated with the access request; and
providing the validation status to the user.

7. The computer system of claim 6, further comprising:
identifying one or more similar characteristics between the matrix barcode and at least one of the malicious matrix barcodes using k-means clustering, wherein each of the one or more similar characteristics exceed a similarity threshold, wherein the similarity threshold is specific to the device associated with the user and includes at least a k-means clustering dimension threshold.

8. The computer system of claim 7, wherein at least one of the one or more similar characteristics is a similar visual characteristic identified based on applying the k-means clustering an image of the matrix barcode and images of the at least one malicious matrix barcode.

9. The computer system of claim 6, wherein the validation status provided to the user is displayed visibly within an internet browser on an end user device (EUD) of the user along with the URL associated with the access request, and wherein the validation status includes visual indicator corresponding to an evaluation and description corresponding to the evaluation, wherein the description corresponding to the evaluation is displayed to the user in response to user feedback received from the user to the validation status of the matrix barcode.

10. The computer system of claim 6, wherein the validating further comprises:
launching a matrix barcode server, wherein the matrix barcode server is an isolated computing environment;
executing the one or more web vulnerability scanning tools within the matrix barcode server to analyze the extracted characteristics of the matrix barcode for potential security threats; and
generating a validation result based on the analysis of the extracted characteristics, wherein the validation result is provided to the user as part of the validation status.

11. A computer program product for risk analysis, comprising:
one or more non-transitory computer-readable storage media and program instructions stored on at least one of the one or more tangible storage media, the program instructions executable by a processor to cause the processor to perform a method comprising:

receiving an access request from a device associated with a user, wherein the access request includes a matrix barcode;

analyzing a matrix barcode associated with the access request by extracting one or more characteristics from the matrix barcode;

performing a characteristic connection between the one or more characteristics from the matrix barcode and a plurality of characteristics from previously identified malicious matrix barcodes stored in a risk knowledge base;

validating the matrix barcode in a matrix barcode secure sandbox using one or more web vulnerability scanning tools, wherein the matrix barcode secure sandbox is comprised of at least a validator, a risk manager, a rule manager, and a sandbox manager, wherein the rule manager is utilized to evaluate the access request based on one or more rules specific to the user, and wherein the validator is configured to process output received from the risk manager and rule manager in determining a validation status of a Uniform Resource Locator (URL) associated with the access request; and providing the validation status to the user.

12. The computer program product of claim 11, further comprising:

identifying one or more similar characteristics between the matrix barcode and at least one of the malicious matrix barcodes using k-means clustering, wherein each of the one or more similar characteristics exceed a similarity threshold, wherein the similarity threshold is specific to the device associated with the user and includes at least a k-means clustering dimension threshold.

13. The computer program product of claim 12, wherein at least one of the one or more similar characteristics is a similar visual characteristic identified based on applying the k-means clustering an image of the matrix barcode and images of the at least one malicious matrix barcode.

14. The computer program product of claim 11, wherein the validation status provided to the user is displayed visibly within an internet browser on an end user device (EUD) of the user along with the URL associated with the access request, and wherein the validation status includes visual indicator corresponding to an evaluation and description corresponding to the evaluation, wherein the description corresponding to the evaluation is displayed to the user in response to user feedback received from the user to the validation status of the matrix barcode.

15. The computer program product of claim 11, wherein the validating further comprises:

launching a matrix barcode server, wherein the matrix barcode server is an isolated computing environment;

executing the one or more web vulnerability scanning tools within the matrix barcode server to analyze the extracted characteristics of the matrix barcode for potential security threats; and generating a validation result based on the analysis of the extracted characteristics, wherein the validation result is provided to the user as part of the validation status.

* * * * *